US008977952B2

(12) United States Patent
Bennett et al.

(10) Patent No.: US 8,977,952 B2
(45) Date of Patent: Mar. 10, 2015

(54) ELECTRONIC BOOK VERSION AND ANNOTATION MAINTENANCE

(75) Inventors: Daniel Bennett, Rosemount, MN (US); John Scott Daup, Eagan, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 13/290,739

(22) Filed: Nov. 7, 2011

(65) Prior Publication Data

US 2013/0117655 A1    May 9, 2013

(51) Int. Cl.
G06F 17/24    (2006.01)
(52) U.S. Cl.
CPC .................... *G06F 17/241* (2013.01)
USPC ......................................... 715/229
(58) Field of Classification Search
CPC ....................................... G06F 17/24
USPC ......................................... 715/229
See application file for complete search history.

(56) References Cited

U.S. PATENT DOCUMENTS

| 7,779,347 | B2 | 8/2010 | Christiansen et al. | |
| 8,266,173 | B1* | 9/2012 | Reztlaff et al. | 707/780 |
| 2002/0133464 | A1* | 9/2002 | Ress et al. | 705/51 |
| 2006/0150079 | A1* | 7/2006 | Albornoz et al. | 715/512 |
| 2007/0294614 | A1* | 12/2007 | Jacquin et al. | 715/512 |
| 2007/0298399 | A1* | 12/2007 | Shao et al. | 434/317 |
| 2008/0229182 | A1 | 9/2008 | Hendricks et al. | |
| 2009/0327855 | A1* | 12/2009 | Le | 715/230 |
| 2012/0096094 | A1* | 4/2012 | So et al. | 709/206 |
| 2012/0284197 | A1* | 11/2012 | Sitrick et al. | 705/301 |

FOREIGN PATENT DOCUMENTS

| EP | 1881417 A1 | 1/2008 |
| WO | 2006/029259 A2 | 3/2006 |

OTHER PUBLICATIONS

Bradford et al., "Digital Statutory Supplements for Legal Education: A Cheaper, Better Way," Jan. 1, 2010, www.digitalcommons.unl.edu.
International Search Report and Written Opinion of the International Searching Authority issued for the corresponding PCT International Application No. PCT/US12/61261 on Jan. 7, 2013.

* cited by examiner

Primary Examiner — Kavita Padmanabhan
Assistant Examiner — Tionna Burke
(74) Attorney, Agent, or Firm — Bart DiVita; Jeanpierre Giuliano (57) ABSTRACT

Techniques are disclosed for maintaining multiple versions of electronic books on an access device and for carrying over annotations between the multiple versions. In one embodiment, an annotation to be carried over between multiple versions may include both a document file indicator and a surrounding text indicator associated with a document file in a version. The document file indicator may be used to determine whether a corresponding document file exists in a differing version. If the document file exists in the differing version, the surrounding text indicator may be used to determine whether the surrounding text exists within the differing version. If the surrounding text exists, the annotation may be inserted at the corresponding location in the differing version. Differing versions may be maintained on the access device based on whether each of the differing versions is a major or minor version. Versions of the electronic book and related annotations may be stored on or off-device.

16 Claims, 6 Drawing Sheets

ELECTRONIC BOOK VERSION AND ANNOTATION MAINTENANCE

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2011 Thomson Reuters.

TECHNICAL FIELD

Various embodiments of the present invention concern systems, methods and interfaces for providing electronic book versions on a mobile access device.

BACKGROUND

For ages, books have provided a wealth of information. In 1440, the invention of the Gutenberg printing press revolutionized the book printing world by producing relatively inexpensive books on paper, as opposed to parchment. This infamous idea sparked an information age where other people besides clergy could afford and/or gain access to print books. While several advancements in printing books have occurred over the years, in 1971, Michael Hart, founder of Project Gutenberg, used a Xerox Sigma V mainframe computer to create the first digitized, electronic book (herein an example of an "eBook"). Using the mainframe computer, he typed (i.e., digitized) a copy of the Declaration of Independence. He believed that computers would one day be accessible to the public and decided to make literary works available in electronic form.

With the creation of the internet, various eBooks started to gain steam. Initially, eBooks were generally written for specific technical areas. For example, the subject matter may have ranged from technical manuals to manufacturing techniques. These eBooks were meant for a small, specific audience and therefore were few and far between. Then around 2001, some major publishing companies finally took notice of the eBook trend. Consequently, electronics hardware manufacturers began to develop eBook readers (herein individually also referred to as an "eReader") in hopes of capitalizing on the eBook phenomenon. In keeping with this emerging trend, publishers launched online stores and partnered with eReader manufacturers to further establish themselves in the eBook marketplace.

Today, due to the global impact of eBooks, publishers are beginning to homogenize eBook publishing formats and eReader manufacturers are developing new device models often to keep up with the competition. In addition, software developers are creating dedicated eReader software that runs, and ultimately displays the eBook, on a dedicated eReader or on multi-purpose access devices such as handheld access devices, smartphones and/or game consoles.

That being said, for eBook purchasing and accessibility options, eBook consumers still subscribe to a print book model. These consumers have come to expect ownership or at least the appearance of ownership of a purchased eBook just as they would with a purchased print book. For example, if a consumer strolls through a bookstore and buys a print book, the consumer has an expectation of ownership in regards to that edition of the print book. The same principle applies for an eBook. Once a consumer peruses an online eBook store and purchases an eBook, the consumer also has an expectation of ownership in regards to that edition of the eBook. In addition, the consumer wants to access the eBook on any eReader compatible access device because he/she feels entitled to that purchased edition. Therefore, publishers and/or content providers, such as AMAZON® and APPLE®, adhere to the expectation that an eBook consumer may download/re-download a purchased eBook to any compatible access device.

However, a challenge arises when the consumer would like to maintain two or more versions (i.e., editions) of the same eBook. When a new version of the same eBook occurs, one known approach overwrites the previous eBook version with a more current version to save space (i.e., memory). While this known approach does save space, it is problematic in many situations. For example, a criminal defense lawyer is representing a client in federal criminal court. The incident and/or charges against his client date back to 2009. Later in 2009, a pretrial motion was presented and decided upon. Nevertheless, the lawyer wishes to appeal the pretrial decision and, in 2011, stands before the court to present his arguments. Since the pretrial motion dates back to 2009, having a copy of the 2009 "Federal Rules of Criminal Procedure" may be beneficial when referring to the rules on pretrial motions in 2009. Additionally, a 2011 copy of the same book may also be beneficial because the appeal is being argued in 2011. In the known approach, the lawyer carries around a 2009 print version and a 2011 print version of "Federal Rules of Criminal Procedure" because known eReader software overwrites the 2009 version at some point with a new version (e.g., the 2011 version). In addition, any annotations that are associated with the 2009 version are erased once overwritten with the new, 2011 version.

There exists a known approach allowing a consumer to download individually two or more eBooks with the same title. However, this known approach does not recognize the relationship between the different versions of the same eBook title. In addition this known approach does not allow annotations to be transferred from one version to another due to the lack of relationship. Referring to the previous example, a consumer downloads the 2009 version of "Federal Rules of Criminal Procedure" several months ago and inserts multiple annotations on this eBook version. A week ago the consumer decides to purchase the 2011 version. Since no relationship exists between the 2009 and 2011 eBooks on the consumer's access device, the 2009 annotations cannot be copied over to the 2011 eBook version. These annotations are important for at least the unmodified sections of "Federal Rules of Criminal Procedure."

To date, consumer eReader platforms such as KINDLE, NOOK™ and iBOOKS have ignored this problem. However, for content aimed at professionals, a better solution is needed.

SUMMARY

The inventors have recognized the necessity for additional improvements in providing multiple versions of an electronic book, particularly on a mobile access device. In particular, the present invention allows a first version of an eBook to be received on the mobile access device. Then, a second version of the eBook is detected and in response to the detection, the second version is received on the mobile access device. Since the present invention allows for multiple versions, a subscription consumer, for example, gains access, via a mobile access device, to all eBooks while he/she maintains an active subscription. Even on lapse of the subscription, the consumer may access all versions of the eBooks that have been previously received on the mobile access device.

Advantageously, the present invention permits a consumer to copy a set of annotations from a previous version to a subsequent version. For example, a set of annotations that were made on a first version of an eBook may be copied and inserted within a second version of the same eBook. In particular, the present invention allows for creating a second set of annotations by copying a first set of annotations corresponding to the first version of an eBook. In this example, the second set of annotations are related to and maybe ultimately inserted into the second version of the same eBook. Finally, after relating and inserting the second set of annotations, the first set of annotations and the second set of annotations are stored in relation to their respective versions.

Additional advantages and/or features of the present invention will be set forth in part in the description. It is to be understood that both the foregoing general description and the following detailed description of the present invention are exemplary and explanatory and are intended to provide further explanation of the present invention as claimed.

DETAILED DESCRIPTION OF THE EXEMPLARY EMBODIMENT(S)

The description includes many terms with meanings derived from their usage in the art or from their use within the context of the description. However, as a further aid, the following examples are presented. An "electronic book" and/ or an "eBook" is a publication in digital form, comprising of text, images, or both, and readable on computers or other electronic devices. Exemplary electronic book content includes statutes, court rules, treatises, newspapers, novels and/or any variant that is capable of being versioned. Some electronic books are not entire book-length publications but instead may be a portion of the electronic book. For example, a portion may be a chapter, section, statute and/or rule of an eBook instead of the complete eBook. Formats for eBooks include markup languages and corresponding markup language files. Markup language files are files written in a markup language. Exemplary markup languages include HyperText Markup Language (HTML), Extensible Markup Language (XML), Extensible HyperText Markup Language (XHTML) and the like. The terms "version," "versions," "edition" and/or "editions" are a particular form of something differing in certain respects from an earlier form or other forms of the same type of thing. For example, a first version of an eBook may differ in certain respects from a second version of the same eBook. The term "instruction" is a command informing an access device (e.g., a computer) to perform a particular operation or set of operations. Various examples of instructions are described herein. The term "retroactive" means taking effect from a date in the past. For example, a retroactive version may be a version that took effect before the consumer's subscription account. The phrase "subscription account" is an arrangement by which recurring access is granted to an online service. For example, a subscription account may grant access to eBooks in which the consumer is entitled based on the subscription arrangement. The phrase "onetime purchase transaction" is a single transaction to purchase an item such as an eBook. The term "annotation" or "annotations" is a note that is made while reading any form of text, images, or both. A note is a brief record of facts, topics, or thoughts, written down as an aid to human memory. Exemplary annotations include notes, highlighted text, and/or underlined text. The phrase "set of annotations" or "sets of annotations" is a grouping of at least one annotation.

Exemplary Document Processing and Information Retrieval System

Figure 1:
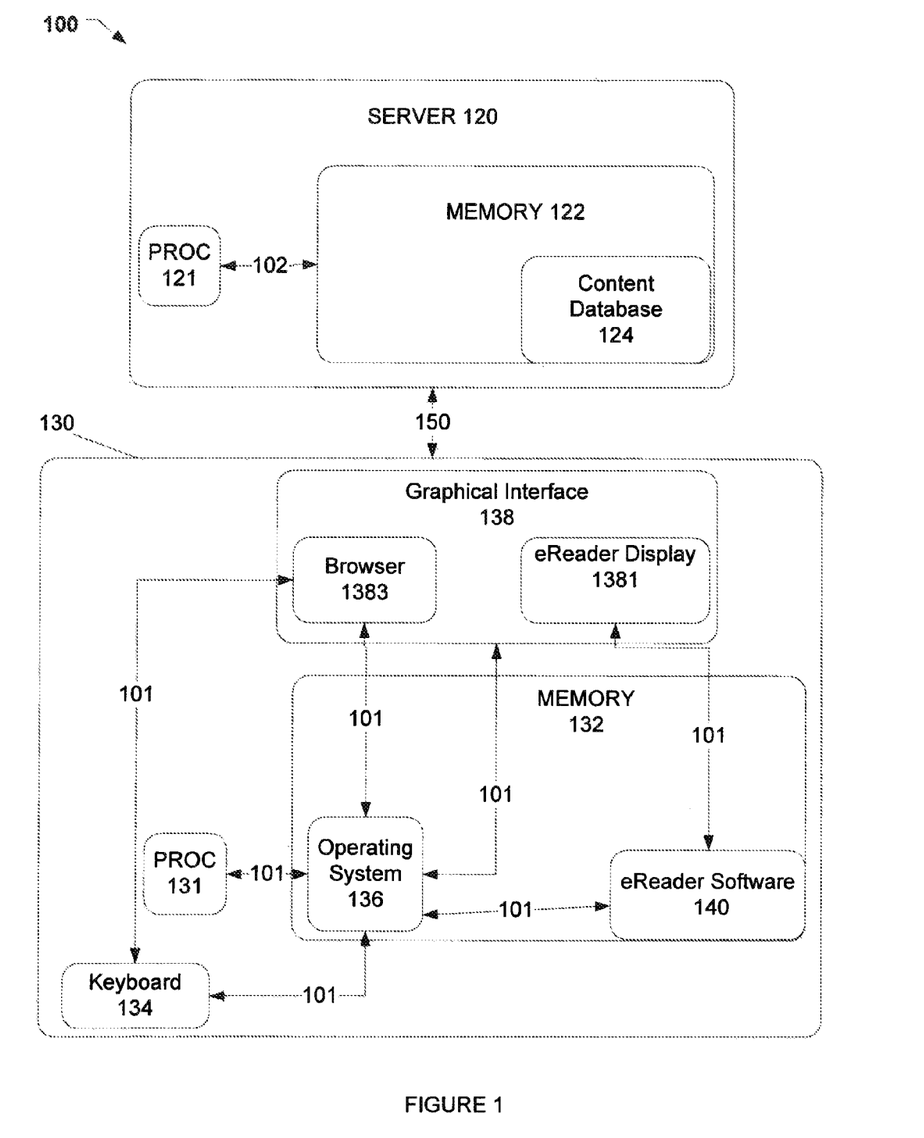
FIG. 1 is an exemplary system 100 which corresponds to one or more embodiments of the invention.
Figure 1A:
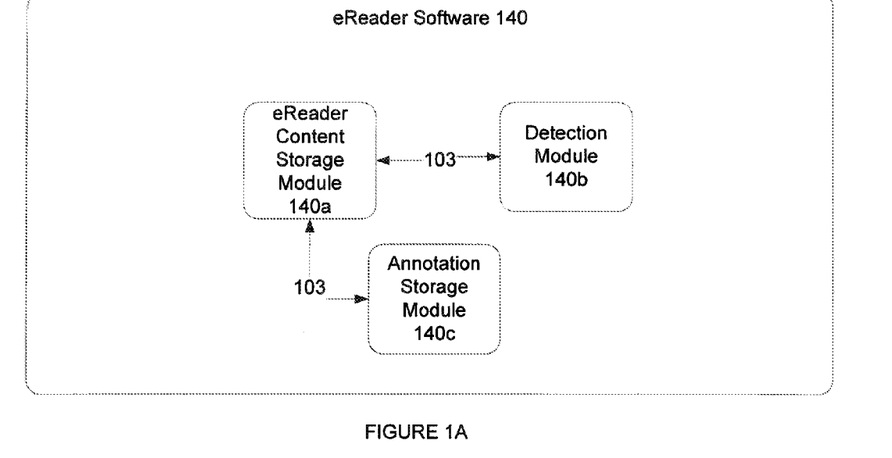
FIG. 1A is a more detailed view of the eReader software 140 of FIG. 1 which corresponds to one or more embodiments of the invention.

FIG. 1 shows an exemplary system 100, which may be adapted to incorporate the capabilities, functions, methods, and interfaces of the present invention. FIG. 1A further shows exemplary eReader software 140, which may be adapted to incorporate into system 100. System 100 includes a server 120 and an access device 130.

Server 120 is generally representative of one or more servers for serving data in the form of a webpage or other markup language with associated applets, ActiveX controls, and/or other related software and data structures. Server 120 includes a processor 121 and a memory 122, wherein the memory 122 further includes a content database 124. All of the components within server 120 are connected via computer bus 102, which is shown in various pathways. Computer buses 101, 102 and/or 103 are buses that transmit information between the access device's components/elements and/or between multiple access devices. For example, computer bus 101 and computer bus 102 aid in transmitting information (e.g., a signal) between access device 130 and server 120. Processor 121 may use computer bus 102 to queue a request, to download an eBook, which is to be transmitted through a signal, from server 120, via a wireless or wireline transmission channel 150 and is then ultimately received by processor 131 through the utilization of computer bus 101. Generally, server 120 transmits the signal via a wireless or wireline transmission channel 150 to at least one access device, such as access device 130. Supplementing the previous example, the signal from server 120 may be associated with a request to display a listing of electronic book versions on access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a content database 124.

Content database 124 takes the exemplary form of one or more electronic, magnetic, and/or optical data-storage devices. Content database 124 includes content such as electronic books and annotations. This content may also be considered subscriber content. Subscriber content includes content and related data for controlling, administering, and managing pay-as-you-go and/or subscription based access. For instance, a consumer may have to purchase an eBook and/or subscribe to an eBook service. The purchased eBook has the format of a markup language file and is stored in the content database 124 until a set of consumer credentials is authenticated. For instance, consumer credentials may be a consumer name and associated password. Once the credentials are successfully authenticated on server 120, a signal, including the markup language file, is transmitted over a wireless or wireline transmission channel 150 to access device 130, in particular eReader content storage module 140a. For purposes described herein, successfully authenticating a set of consumer credentials means the consumer credentials were accepted by an authentication system (not shown). This successful authentication allows for receiving and/or transmitting the markup language file (i.e., the eBook).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective consumer interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Memory 132 is coupled, via computer bus 101, to processor module 131.

A computer readable eReader software 140 (herein also referred to as "eReader software") is stored in memory 132 (e.g. RAM) and/or hard drive (not shown). Memory 132 and hard drive (not shown) are examples of main memory and secondary memory, respectively. Some exemplary embodiments have the eReader software 140 being stored in a computer-readable medium product of any type. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136 and eReader software 140. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134, the processor 131, and the eReader software 140. For example, the keyboard 134 sends inputs, via computer bus 101, to the operating system 136. The operating system 136 determines that the eReader software 140 is active, accepts the eReader software input as data and stores that data temporarily in memory 132 (e.g. RAM). Each instruction from the eReader software 140 is sent by the operating system 136, via computer bus 101, to the processor 131. These instructions are intertwined with instructions from other programs that the operating system 136 is overseeing before being sent to the processor 131. Operating system 136 and browser 1383 not only receive inputs from keyboard 134, but also support rendering of graphical consumer interfaces within graphical interface 138.

Graphical interface 138 includes a browser 1383 and an eReader display 1381. When the eReader software 140 is launched, an eReader display 1381 is defined in memory 132 and rendered on graphical interface 138. Upon rendering, the graphical interface 138 presents the data in association with a set of modules from the eReader software 140 as further discussed herein.

FIG. 1A illustrates an exemplary embodiment of the eReader software 140. In some embodiments, the eReader software 140 may be downloaded from server 120 to access device 130, through a signal, via a wireless or wireline transmission channel 150. The eReader software 140 is operatively connected to operating system 136, via computer bus 101, and configured to execute a set of modules from memory 132. The modules include an eReader content storage module 140a, a detection module 140b and an annotation storage module 140c. Each module is described herein. The eReader content storage module 140a takes the exemplary form of one or more electronic, magnetic, and/or optical data-storage devices. The eReader content storage module 140a is configured to receive a first signal. The first signal is associated with a first version of an electronic book. For example, a consumer may initiate a download of a first version of an eBook entitled "Federal Rules of Civil Procedure" to access device 130 from content database 124. In order to successfully download the first version, the eReader content storage module 140a is configured to receive a first signal, via wireless or wireline transmission channel 150, where the first signal is associated with the first version of the "Federal Rules of Civil Procedure." The eReader content storage module 140a is also configured to store the first version associated with the first signal.

The detection module 140b is configured to receive a detection indication of a second version of the electronic book. Exemplary detection is described herein via method 200 and FIG. 3 in addition to corresponding descriptions. Responsive to the detection indication, the eReader content storage module 140a is configured to receive a second signal associated with the second version and an addition instruction. The addition instruction is adapted to retain the first version and add the second version to a memory associated with an access device (e.g., an eReader). Continuing from the previous example, the eReader content storage module 140a is configured to receive a second signal, via wireless or wireline transmission channel 150, associated with the second version of the "Federal Rules of Civil Procedure." The second signal also includes an addition instruction adapted to retain the first version within the eReader content storage module 140a and add the second version of the "Federal Rules of Civil Procedure" to the eReader content storage module 140a. Thus, the first and second versions of the "Federal Rules of Civil Procedure" ultimately reside within the eReader content storage module 140a. In some embodiments, the detection module 140b is further configured to receive a detection indication of at least one different version of the electronic book. In addition, the eReader content storage module 140a is further configured to receive, responsive to the detection indication, a different signal, via wireless or wireline transmission channel 150, associated with the different version and a different instruction where the different instruction is adapted to retain at least one other version and add the different version. Put another way, mathematicians may say where there are multiples versions such as $1^{st}$, $2^{nd}$, $3^{rd}$ . . . $n^{th}$ versions, the eReader content storage module 140a is further configured to receive, responsive to the indication, an $n^{th}$ signal associated with an $n^{th}$ version and an $n^{th}$ instruction where the $n^{th}$ instruction is adapted to retain at least one other version and add the $n^{th}$ version. Examples of different versions and/or $n^{th}$ versions are described herein.

In other embodiments, an annotation storage module 140c is configured to generate and transmit, via wireless or wireline transmission channel 150, a storage signal. The storage signal is associated with a storage instruction adapted to store a first set of annotations corresponding to the first version of the electronic book. The first set of annotations may be stored, for example, in the annotation storage module 140c and/or the content database 124. Additionally, the annotation storage module 140c is further configured to generate and transmit, via wireless or wireline transmission channel 150, a copy signal. The copy signal is associated with a copy instruction adapted to copy the first set of annotations corresponding to the first version of the electronic book (herein sometimes referred to as "the second set of annotation corresponding to the first version of the electronic book"). The second set of annotations may be stored, for example, in the annotation storage module 140c and/or the content database 124. Furthermore, the annotation storage module 140c is configured to receive a delivery signal. The delivery signal is associated with a second set of annotations and a delivery instruction adapted to correlate the second set of annotations corresponding to the first version to the second version of the electronic book where the second set of annotations is associated with a copy of the first set of annotations.

Exemplary Method 200 as Conducted by System 100

Figure 2:
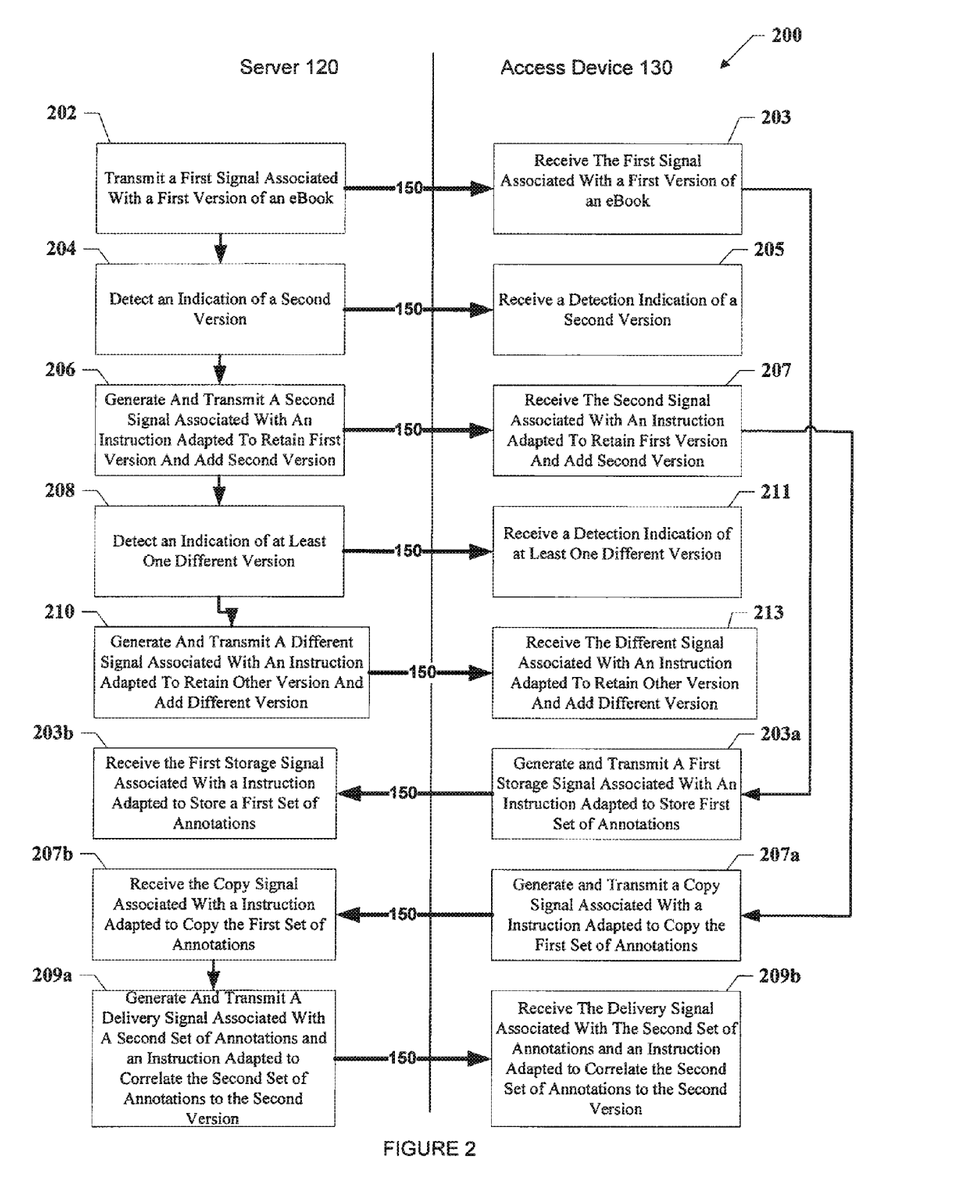
FIG. 2 is an exemplary method 200 which corresponds to one or more embodiments of the invention.

Referring now to FIG. 2, system 100 is configured to implement method 200, which may be adapted to incorporate the capabilities, functions, systems, and interfaces of the present invention. Method 200 includes functional blocks 202-213 and sub-blocks 203a-209b. These functional blocks are steps that perform actions including assignments, decisions, assessments and other like functions.

In some embodiments, prior to method 200 commencing, an eBook publisher, for example, takes an electronic book and uploads it to content database 124. Once an eBook is uploaded into content database 124, a consumer of system 100 is granted access to certain eBooks based on the credentials described earlier. These accessible eBooks are now available to the consumer for download. Then beginning at step 202, a first signal is transmitted from server 120. The first signal is associated with a first version of an electronic book. For example, the eBook, via the first signal, is then automatically transmitted from server 120, through a wireless or wireline transmission channel 150, to access device 130. Next at step 203, the access device 130 receives the first signal associated with the first version of the electronic book. Once the eBook is received, the access device 130 may store the first version of the eBook in the eReader content storage module 140a. Various events may trigger the first signal being transmitted and received. These events include but are not limited to uploading, automatically, a new subscription eBook, prompting the consumer that a new eBook is available for download, allowing the consumer to select an eBook to download and/or any combinations/equivalents thereof. For example, a first version of an electronic book entitled "Federal Rules of Civil Procedure" with a 2010 publication year is uploaded to content database 124. Due to the consumer's subscription status, the consumer is entitled to the eBook. First, a first signal associated with the first version of "Federal Rules of Civil Procedure" is transmitted, via a wireless or wireline transmission channel 150, to access device 130. Second, the access device 130 receives the first signal associated with the first version of "Federal Rules of Civil Procedure" and eventually stores the first version in the eReader content storage module 140a. In some embodiments, a version that is transmitted via a signal, and ultimately stored in eReader content storage module 140a, is a cached copy of the eBook. A cached copy enables the consumer to access the eBook without having to access the content database 124, via the wireless or wireline transmission channel 150. Put another way, the cached copy enables offline access (i.e., no internet access) to the eBook. In other embodiments, a consumer adds annotations to the first version of the electronic book. In those cases, prior to sub-step 203a, a first set of annotations corresponding to the first version of the electronic book is stored in the annotations module 140c. Annotation creation and storage techniques are known to those skilled in the art. Then, in sub-step 203a, a storage signal is generated and transmitted, via the wireless or wireline transmission channel 150, to server 120. A storage signal is associated with a storage instruction adapted to store the first set of annotation, for example, in content database 124. Next, in sub-step 203b, the storage signal is received by server 120 and the first set of annotations is stored in content database 124. Sub-steps 203a-203b are also referred to as a method for synchronization. Further explanation of synchronization and/or synchronizing information between access device 130 and server 120 is described herein. Referring back to step 202, once the first version of the electronic book is received on an access device 130, the process moves to step 204.

In step 204, an indication of a second version of the electronic book is detected. Detection transpires when synchronization occurs between the eReader content storage module 140a and content database 124. This synchronization may occur for a couple of reasons. First, a publisher may want to monitor the entitled content and/or the content the consumer chooses to store on access device 130. For example, a onetime purchase may only be entitled to one year of eBook access. Having the ability to synchronize allows system 100 to recognize through the subscription account what a consumer should have access to and for how long. Alternatively, the consumer may decide to delete a version of an eBook from access device 130 to save space. This allows the cached copy of the eBook residing in eReader content storage module 140a to be deleted. However, the copy that resides in content database 124 remains and the content database 124 also permits the consumer to access to this version of the eBook based on the subscription account. Therefore if the consumer ever wants to re-download that entitled version, system 100 is capable of allowing access and re-downloading that version. Second, having a copy of the set of annotations that is stored outside of the access device 130 prepares for situations where the consumer cannot access the annotations on the access device 130 (e.g., loss of access device, damage to access device, and/or replacement of access device). Synchronizing a copy of the set of annotations allows the consumer to access these annotations from any access device 130 that has the installed eReader software 140. Synchronizing occurs when there is online access (i.e., internet access) between access device 130 and server 120. Wireless or wireline transmission channel 150 is configured to send signals between access device 130 and server 120. An exemplary signal could be information regarding the synchronizing of content between access device 130 and content database 124. In addition, since there is a cached copy of the eBook and/or annotations, a consumer may access the cached copy from the access device 130 without the need to access the content online (i.e., offline access). The offline eBook may not be as current as when the access device has online access to synchronize due to the fact the content database 124 has the most up-to-date version of the eBook. On the other hand, annotations added to eReader content storage module 140*a* while offline are the most current and are updated in the content database 124 once access device 130 and server 120 have synchronized.

Figure 3:
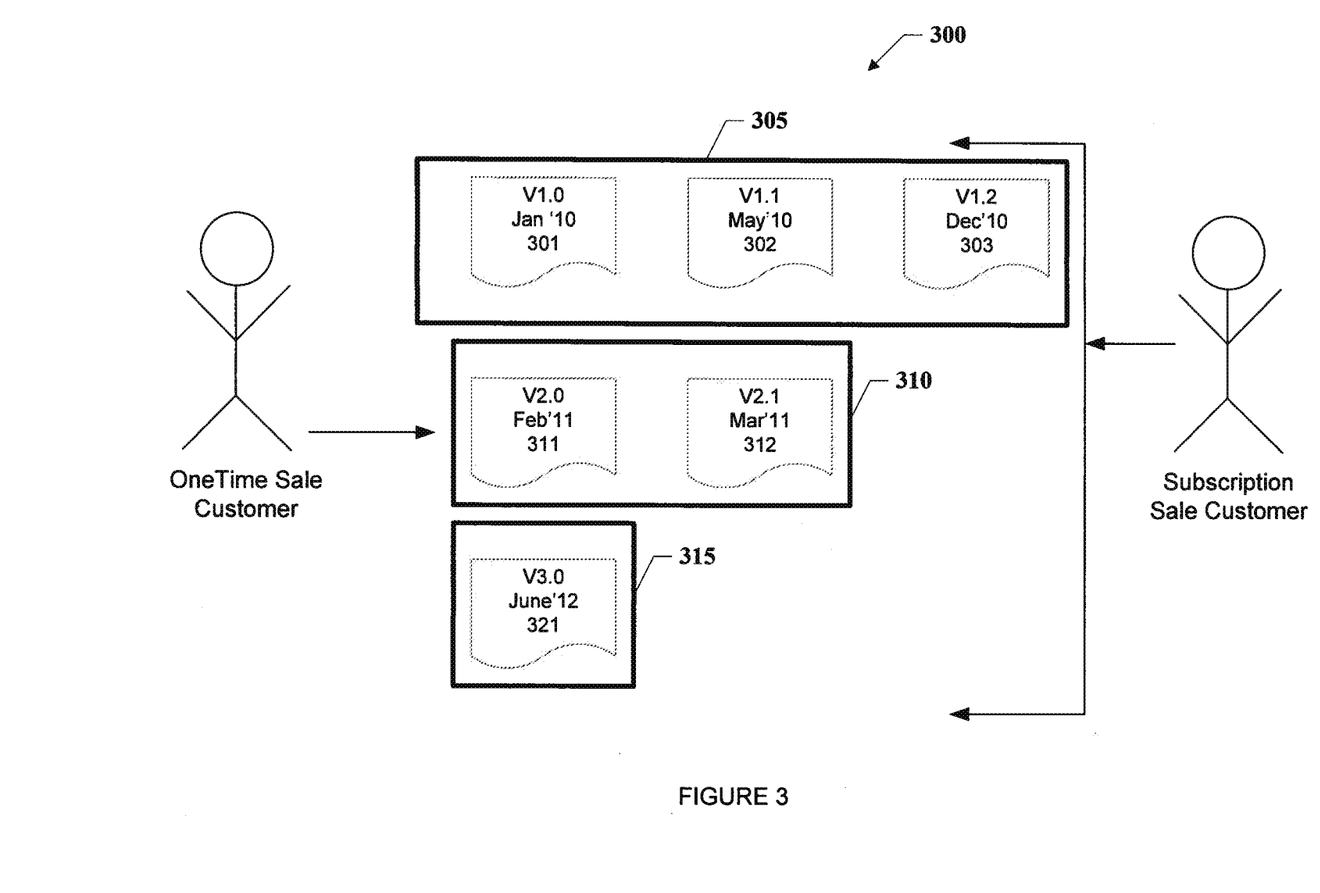
FIG. 3 is an exemplary versioning illustration 300 which corresponds to one or more embodiments of the invention.

Referring back to step 204, in order for method 200, as conducted by system 100, to detect a second version, the second version must be known. Therefore, FIG. 3 shows a versioning illustration 300 regarding versions of an eBook within content database 124. In FIG. 3 there are two types of versions: major and minor. A major version is an edition of an electronic book with significant editorial revision. A minor version is a version where errors (e.g., typographical, grammatical and the like) are fixed. For example, a major version may include a significant editorial revision such as adding a chapter. An example of a minor version may include fixing all of the typographical errors from the previous version. Since multiple versions may be stored, perhaps indefinitely, it is incumbent on the publisher not to publish major versions of eBooks too frequently. Frequent major version may increase storage costs while continuing to confuse the consumer. An intent with versioning is to model the print world of editions by not using major versions as a solution for near "real time" updates. Rather, minor versioning should be used for frequently updating content.

In FIG. 3 three sets of versions 305, 310, 315 are shown. Each set of versions includes a major version and possibly minor versions. A set of versions may only include a major version. Each version number within the set of versions includes a major version field and a minor version field, respectively. For example, if a version number is V4.3, the "4" represents the major version number and the "3" represents the minor version number. Exemplary major versions include, for example, a first major version V1.0 301, a second major version V2.0 311, and third major version V3.0 321. Also a set of versions may include minor versions. Exemplary minor versions include, for example, V1.1 302, V1.2 303, and V2.1 312. Once a new instance of a version is either included into a set of versions (i.e., a minor version) or starts a new set of versions (i.e., a major version) and ultimately stored in content database 124, a detection indication of that version is received by detection module 140*b* via method 200. For example, a first minor version (e.g., V3.1) could be added to the set of versions 315 and an indication of that version is detected. In another example, a fourth major version (e.g., V4.0) would start a new set of versions and an indication of that version is detected. Referring back to FIG. 2, after the indication of the second version of the electronic book is detected, the method continues to steps 205 and 206. Steps 205 and 206 may be executed in parallel or sequentially. In step 205, a detection indication of the second version is received by access device 130. In step 206, a second signal is generated, in response to detecting, and transmitted.

Furthermore, in step 206, the second signal is associated with an addition instruction and the second version where the addition instruction is adapted to retain the first version and add the second version. Referring back to FIG. 3, a detection indication of a second major version V2.0 311 is received by detection module 140*b*. Next, a second signal associated with the second major version V2.0 311 is generated and transmitted, via wireless or wireline transmission channel 150, from server 120. In addition, the second signal is associated with an addition instruction adapted to retain the first major version V1.0 301 and add the second major version V2.0 311. For example, the first major version V1.0 301 is ultimately retained within the eReader content storage module 140*a* and the second major version V2.0 311 is ultimately added to the eReader content storage module 140*a*. In some embodiments, only the latest minor version for each major version is accessible to the consumer on the access device. In other words, each minor version overwrites the previous minor version with the set of versions. In FIG. 3, for instance, the consumer may only see V1.2 303, V2.1 312 and V3.0 321 because these are the latest minor versions of their set of versions 305, 310, 315, respectively. Therefore when V1.2 303 is detected, V1.2 303 overwrites V1.1 302 to save space (i.e., memory). Referring back to FIG. 2, once the second signal is transmitted via wireless or wireline transmission channel 150 to access device 130, step 207 initiates by receiving the second signal and, for example, storing the second version of the electronic book, associated with the second signal, in the eReader content storage module 140*a* of access device 130. Transmitting and ultimately storing multiple versions of the same eBook permits a consumer to access all the versions of an eBook within access device 130. This is particularly beneficial, for example, in courtroom settings where a lawyer may need to not only reference current 2011 court rules but also 2009 court rules. Each version would be easily accessible to the consumer on the access device 130.

Figure 3A:
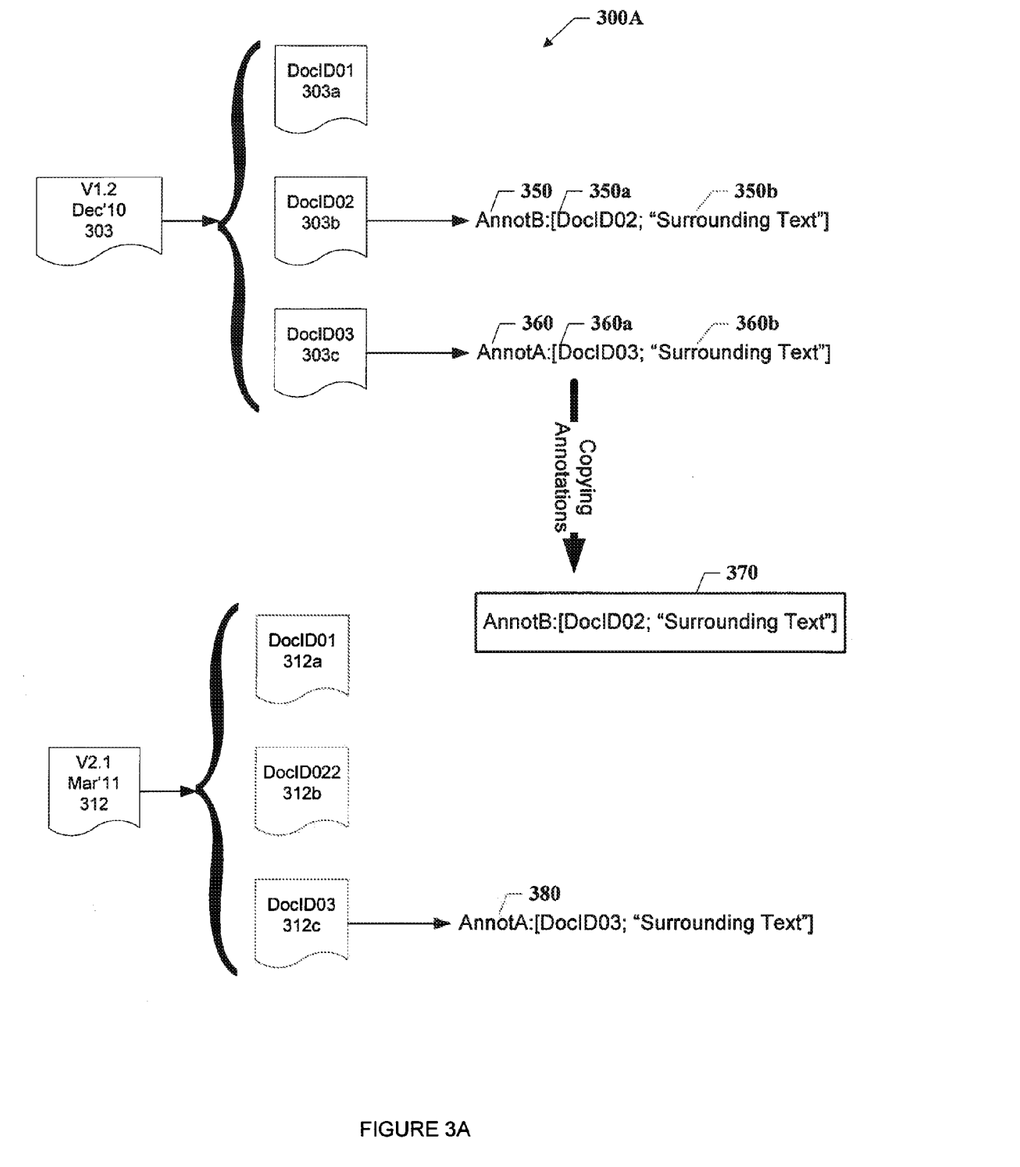
FIG. 3A is an exemplary annotation copying and correlating illustration 300A which corresponds to one or more embodiments of the invention.

In some embodiments, a consumer wants to "carry over" or copy annotations from the first version of the electronic book to the second version. In those instances, sub-step 207*a* initiates with a copy signal being generated and transmitted, via wireless or wireline transmission channel 150, from access device 150. The copy signal is associated with a copy instruction adapted to copy a first set of annotations. The copy of the first set of annotations may also be known as the second set of annotations corresponding to the first version of the electronic book. Next, in sub-step 207*b*, the copy signal is received by server 120 and ultimately the first set of annotations is copied and stored in the content database 124. The first and second sets are stored as separate sets of annotations. Then, in sub-step 209*a*, a delivery signal is generated and transmitted via wireless or wireline transmission channel 150. The delivery signal is associated with a second set of annotations and a delivery instruction adapted to correlate the second set of annotations corresponding to the first version to the second version where the second set of annotations is associated with a copy of the first set of annotation. Finally, in sub-step 209*b*, the delivery signal is received by access device 130. Additionally, the delivery instruction adapted to correlate the second set of annotations to the second version is executed in the annotation module 140*c*. In other words, the annotations of the second set of annotations are reconciled and inserted in their proper location within the second version of the electronic book. FIG. 3A further illustrates an exemplary annotation copying and correlating illustration 300A.

For example, FIG. 3A shows a detailed view of a first version V1.2 303 and a second version V2.1 312, each of which contain multiple document files (i.e., markup language files) that encompass their respective version of the eBook along with corresponding annotations. In the case where multiple document files exist, each document file may represent a chapter within the respective version of the eBook. In the current instance, three document files comprise V1.2 303: DocID01 303*a*, DocID02 303*b* and DocID03 303*c* and three document files comprise V2.1 312: DocID01 312*a*, DocID022 312*b* and DocID03 312*c*. Each annotation copied from the first version includes a document file indicator and a surrounding text indicator. For example, AnnotA 360 from first version V1.2 303 contains a document file indicator, DocID03 360*a*, and a surrounding text indicator, "Surrounding Text" 360*b*. As each annotation is copied from the first version, the annotation module 140*c* is configured to use the document file indicator in each corresponding annotation to determine if the document file exists within the second version. If the document file is not found, the annotation is marked as an orphan and placed at the beginning of the second version of the electronic book. For example, AnnotB 350 includes document file indicator DocID02 350*a* and annotation module 140*c* is configured to determine if the document file DocID02 exists within the second version V2.1 312. In this case, DocID02 does not exist within the second version V2.1 312. Therefore, in the second set of annotations, AnnotB 370 is considered an orphan and placed at the beginning of the second version of the electronic book. For all orphan annotations, the consumer is presented with an interface (not shown) that allows them to manually move an orphan annotation to an appropriate location in the second version of the electronic book. On the other hand, if the document file is found, then the annotations module 140*c* is further configured to use the surrounding text indicator to determine if the surrounding text exists within the second version. Determining the existence of text within a document/markup language file uses techniques known to those skilled in the art such as keyword searching. If the surrounding text is found, the annotation is inserted at the corresponding location in the second version of the electronic book. In another example, AnnotA 360 is copied from the first version V1.2 303 and annotation module 140*c* is configured to use the document file indicator, DocID03 360*a*, to determine if the document file exists within the second version. In this case, DocID03 312*c* does exist within the second version V2.1 312. Next, the annotation module 140*c* is configured to use the surrounding text indicator, "Surrounding Text" 360*b* to determine if the surrounding text exists within the second version. Once the surrounding text is determined to exist, AnnotA 380 is inserted at the corresponding location in the second version V2.1 312 of the eBook. If the surrounding text is not found, the annotation is marked as an orphan and placed at the beginning of the second version of the electronic book.

Once the second version of the electronic book is transmitted, via the second signal and ultimately added, a consumer has the ability to access and view the first and second versions of the eBook including the corresponding annotations. Display (i.e., view) systems and interfaces are described herein and/or are known to those skilled in the art. In particular, reference FIG. 4 and its corresponding written description for an exemplary interface illustrating a listing of eBooks including versions of the eBook entitled "Federal Rules of Civil Procedure."

In some embodiments, different, additional versions are detected. In that case steps 208-213 are executed in an identical method to steps 204-207, respectively. In those embodiments, an indication of at least one retroactive version of the eBook is detected. Next, a different signal is generated, in response to the detecting, and transmitted. The different signal is associated with the at least one different version and a different instruction adapted to retain at least one other version and add the at least one different version. The at least one different version may be a third version, a fourth version, an $n^{th}$ version, user-selected previous versions, access device selected previous versions and/or any combination thereof. The at least one other version may be the first version, the second version, an $n^{th}$ version, user-selected previous versions, access device selected previous versions and/or any combination thereof. For example, if a third major version is detected, step 208 detects this third major version indication. Next, step 211 receives the third major version indication and step 210 generates and transmits the third signal. Steps 211 and 210 may be executed in parallel or sequentially. The third signal is associated with the third major version and an addition instruction adapted to retain the second major version and add the third major version. Finally, the third signal is received by access device 130. By executing steps 208-213, the third major version may ultimately be added, for example, to the eReader content storage module 140*a*. In another example, the addition instruction is adapted to retain the first through second major versions and add the third major version. Sub-steps 203*a*-209*b* may also be executed to account for different sets of annotations. Continuing the previous example, a third set of annotations corresponding to the second version of the electronic book is copied and correlated to the third version of the electronic book. Put another way, the annotations from the second version of the eBook are copied, for example, and inserted into the third version of the eBook. These annotations are inserted (using correlation) in the third version via the previous description of correlating a first set of annotations to the second set of annotations.

In other embodiments, different, retroactive versions are detected. In those embodiments, an indication of at least one retroactive version of the eBook is detected. Next, a different signal is generated, in response to the detecting, and transmitted. The different signal is associated with the at least one retroactive version and a different instruction adapted to retain at least one other version and add the at least one retroactive version. The different version embodiments are particularly beneficial when a consumer has a subscription account. For example, in FIG. 3, the subscription sale consumer has a subscription account to all electronic versions of "Federal Rules of Civil Procedure." Furthermore, in this example, the subscription started on Jan. 1, 2010 and today's date is Jan. 3, 2010. Therefore, only the most current version ultimately resides within the eReader content storage module 140*a* because the time between the subscription account start-up and today's date is brief. However, the subscription sale consumer has the option to receive at least one retroactive version (through transmitting a different signal) and the at least one retroactive version is added, for example, to the eReader content storage module 104*a*. Referring back to the previous example, the subscription sale consumer, in these embodiments, may access at least one retroactive version of the "Federal Rules of Civil Procedure." A significant benefit is afforded to the consumer by allowing the option to select which versions, current, future and/or retroactive, are needed. In addition, in some embodiments where retroactive signals are transmitted, the subscription account may have to be modified and/or supplemented to allow entitlement to retroactive versions. For instance, when the subscription sale consumer started the subscription on Jan. 1, 2011, the subscription account may have a field that states he/she has access to this eBook title from this point in time into the future (or until entitlement access ceases). In order to adjust for access to retroactive versions, the subscription account may have to modify or supplement a field stating the subscription account has a certain date but that the consumer is allowed access to all retroactive versions for the eBook title.

In some embodiments, on lapse of the subscription account, the consumer looses online access to additional eBooks. However, the consumer may retain offline access to the latest minor version of each major version of an eBook. Regardless of whether the consumer's subscription has lapsed, the consumer is allowed to delete an eBook (or a version of an eBook) from the access device 130 and then subsequently re-synchronize. In other words, a consumer may re-synchronize to re-add an already owned book but may not download a new version in which the consumer does not have a subscription. In other embodiments, a consumer that initiates a onetime purchase transaction has offline access to the major version, and any subsequent minor versions of the major version, with the ability to re-synchronize as described above. Yet in other embodiments, online access for a lapsed subscription account and/or a onetime purchase transaction may be granted for a predetermined period such as one year after purchase and/or subscription lapse. Whether a subscription account is in place or a onetime purchase occurs, content database 124 stores a copy of all annotations within server 120 and annotations module 140c stores another copy of all annotations within access device 130.

In other embodiments, the timing of generating and transmitting the various signals (e.g., first signal, second signal, different signal, copy signal, storage signal and/or delivery signal) may correspond with lengthy publishing timelines. For example, the first signal associated with a first version of an eBook may be transmitted on Jan. 1, 2009 because that is the earliest release date for that version. Then, two years go by before a second version is published. Once that second version is detected, method 200 as conducted by system 100 is executed and the second signal associated with the second version is transmitted two years after the first signal is transmitted. The transmission timelines may vary accordingly with the publishing/releasing timelines of the next, new version.

Exemplary Interfaces

Figure 4:
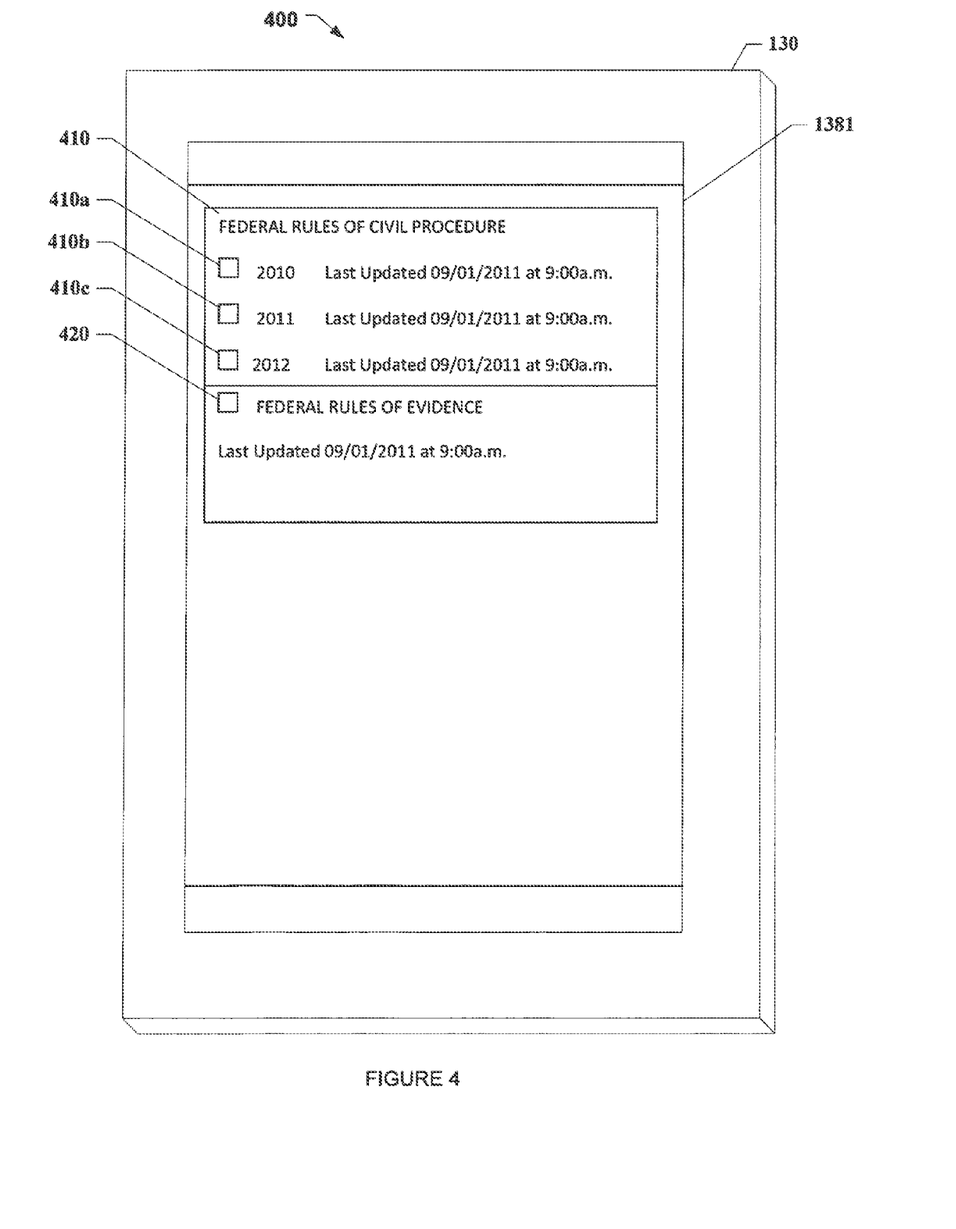
FIG. 4 is an exemplary interface 400 which corresponds to one or more embodiments of the invention.

FIG. 4 show an exemplary interface 400 for system 100 and method 200. FIG. 4 illustrates an exemplary eReader display 1381 on an access device 130, for this example, an APPLE® iPad. EReader display 1381 displays a listing of electronic books, "Federal Rules of Civil Procedure" 410 and "Federal Rules of Evidence" 420. In addition, eReader display 1381 also lists the three versions of "Federal Rules of Civil Procedure" 410: "2010" version 410a, "2011" version 410b and "2012" version 410c. In one example, FIG. 3 may correspond to the listing of the three versions of "Federal Rules of Civil Procedure" 410. For example, the set of versions 305 may correspond with the major and all minor versions within the year 2010, the set of versions 310 may correspond with the major and all minor versions within the year 2011 and the set of versions 315 may correspond with the major version within the year 2012. As stated previously, in some embodiments, minor versions may overwrite other versions such as, in FIG. 3, V1.2 303 may overwrite V1.1 302 once an indication that the V1.2 303 version is detected and V1.2 303 is transmitted via an exemplary second signal and ultimately added, for example, to the eReader content storage module 140a. For example, a correlation between the versions listing in FIG. 4 and the sets of versions 305, 310 and 315 in FIG. 3 may include V1.2 303 correlating with 2010 version 410a of "Federal Rules of Civil Procedure" 410, V2.1 312 correlating with 2011 version 410b of "Federal Rules of Civil Procedure" 410 and V3.0 321 correlating with 2012 version 410c of "Federal Rules of Civil Procedure" 410.

The embodiments described above and in the claims are intended only to illustrate and teach one or more ways of practicing or implementing the present invention, not to restrict its breadth or scope. For example, the eReader software 140 may be stored elsewhere besides the memory 132 of the access device 130. Any location within the access device 130 where data can be temporarily and/or permanently stored is acceptable. Another example, FIG. 1 shows browser 1383 and eReader display 1381 as having the ability to display simultaneously. However, in operation, some embodiments may present them at separate times. The actual scope of the invention, which embraces all ways of practicing or implementing the teachings of the invention, is defined by the claims and their equivalents.

What is claimed is:

1. A method of maintaining annotations across versions of an electronic book comprising:

receiving at an access device a version of an electronic book and a signal instructing the access device to correlate a set of annotations associated with a different version of the electronic book with the received version of the electronic book, the received and different versions of the electronic books each including at least one document file, wherein each annotation in the set of annotations includes a document file indicator corresponding to the at least one document file with which the annotation is associated;

using the document file indicator to compare each annotation of the set of annotations with the received version of the electronic book in order to determine where the annotation should be inserted into the received version of the electronic book, wherein if the received version of the electronic book does not include a document file indicator that matches a document file indicator of the different version of the electronic book, the annotation associated with the document file indicator of the different version is inserted at the beginning of the received version of the electronic book; and, inserting each annotation of the set of annotations into a location of the received version based on the comparing.

2. The method of claim 1, wherein the location of the annotation in the received version of the electronic book is a corresponding location of the annotation in the different version of the electronic book.

3. The method of claim 1, wherein the location of the annotation in the received version of the electronic book is at the beginning of the received version of the electronic book.

4. The method of claim 3, wherein the annotation is marked as an orphan annotation.

5. The method of claim 1, wherein each annotation document file indicator further includes a surrounding text indicator, and wherein the inserting is based at least in part on the surrounding text indicator.

6. The method of claim 5, wherein the inserting is based is based at least in part on keyword searching using the surrounding text indicator.

7. The method of claim 1, wherein the set of annotations associated with a different version of the electronic book is stored on the access device.

8. The method of claim 1, wherein a copy of the set of annotations associated with a different version of the electronic book is stored on a server, and wherein the method is carried out when the access device is synchronized with the server.

9. The method of claim 1, further comprising:

storing the different version of the electronic book in memory of the access device.

10. The method of claim 9, further comprising:
    determining whether the received version of the electronic book is a major or minor version of the different version of the electronic book; and,
    storing the received version of the electronic book in memory of the access device based on the determining.

11. The method of claim 10, wherein if the received version of the electronic book is a major revision of the different version of the electronic book, the received version of the electronic book is stored in memory separately from the different version, and wherein if the received version of the electronic book is a minor revision of the different version of the electronic book, the different version of the electronic book is overwritten with the received version of the electronic book.

12. An access devise comprising:
    a processor;
    a memory coupled to the processor and storing an eReader software program that when executed causes the processor to:
        receive a version of an electronic book and a signal instructing the access device to correlate a set of annotations associated with a different version of the electronic book, the received and different versions of the electronic book each including at least one document file, wherein each annotation in the set of annotations includes a document file indicator corresponding to the at least one document file with which the annotation is associated;
        use the document file indicator to compare each annotation of the set of annotations with the received version of the electronic book in order to determine where the annotation should be inserted into the received version of the electronic book, wherein if the received version of the electronic book does not include a document file indicator that matches a document file indicator of the different version of the electronic book, the annotation associated with the document file indicator of the different version is inserted at the beginning of the received version of the electronic book; and,
        insert each annotation of the set of annotations into a location of the received version based on the comparing.

13. The access device of claim 12, where in each annotation location indicator further includes a surrounding text indicator, and wherein the location is based at least in part on the surrounding text indicator.

14. The access device of claim 13, wherein the location is based is based at least in part on keyword searching using the surrounding text indicator.

15. The access device of claim 12, wherein the processor further causes the eReader software program to:
    determine whether the received version of the electronic book is a major or minor version of the different versions of the electronic book; and,
    store the received version of the electronic book in memory of the access device based on the determining.

16. The access device of claim 15, wherein if the received version of the electronic hook is a major revision of the different version of the electronic book, the processor causes the eReader software program to store the received version of the electronic book in memory separately from the different versions, and wherein if the received version of the electronic book is a minor revision of the different version of the electronic book, the processor causes the eReader software program to overwrite the different version of the electronic book with the received version of the electronic book.

\* \* \* \* \*